United States Patent [19]

Gelfman

[11] 4,446,776
[45] May 8, 1984

[54] HEATING ACCESSORY

[75] Inventor: Stanley Gelfman, Riverdale, N.Y.

[73] Assignee: Krischer Metal Products Co., Inc., Moonachie, N.J.

[21] Appl. No.: 485,957

[22] Filed: Apr. 18, 1983

[51] Int. Cl.³ .............................................. A47J 37/00
[52] U.S. Cl. ........................................ 99/401; 99/447; 99/450; D7/359
[58] Field of Search ................. 99/450, 401, 447, 433, 99/389, 446; D7/359

[56] References Cited

U.S. PATENT DOCUMENTS

| 74,282 | 2/1868 | Beeman | 99/450 |
|---|---|---|---|
| D. 246,627 | 12/1977 | Sugiyama | 99/450 X |
| 709,048 | 9/1902 | Sausser | 99/450 |
| 1,066,552 | 7/1913 | Taylor | 99/450 |
| 1,200,741 | 10/1916 | Lindgren | 99/450 |
| 1,862,420 | 6/1932 | O'Brien | 99/447 X |
| 2,573,719 | 11/1951 | Lebherz | 99/447 X |
| 2,742,850 | 4/1956 | La Fond | 99/447 X |
| 2,766,682 | 10/1956 | Smith | 99/447 X |
| 3,786,741 | 1/1974 | Plumley | 99/447 |
| 4,078,479 | 3/1978 | Mori | 99/447 |

FOREIGN PATENT DOCUMENTS

| 84123 | 8/1935 | Sweden | 99/450 |
|---|---|---|---|
| 73275 | 1/1916 | Switzerland | 99/450 |

Primary Examiner—Billy J. Wilhite
Attorney, Agent, or Firm—McAulay, Fields, Fisher, Goldstein & Nissen

[57] ABSTRACT

Disclosed is a heating appliance comprising a first and second section, the first section having a top surface supported by side walls via an interconnecting conical transition section. The top surface is formed with a peripherally extending raised rim adjacent a plurality of apertures arranged in groups wherein adjacent groups are separated by a spacing having a louvered vent therein. A second raised rim separates a second group of louvered vents which are radially aligned with the spacing between adjacent apertures within each group of apertures. Air pockets in the surface underside are aligned with the raised rims. A cover or second section having a plurality of openings is formed with a declined extending lip for positioning on the conical transition section.

20 Claims, 5 Drawing Figures

HEATING ACCESSORY

BACKGROUND OF INVENTION

The present invention is in a heating accessory and more specifically relates to a potato baker or bun warmer which may be used in conjunction with a stove top or other heating device.

The art of cooking has existed for nearly as long as man has been aware of fire. Early man simply impaled his food with a stick and held it in a flame. Today the home appliance industry has provided a variety of accessories useful for the preparation of various foods in a variety of ways. Many of the appliances rely on electrically generated heat such as the electric toaster while others are based on molecular stimulation such as a microwave oven. However, a considerable amount of the cooking or heating of foods still directly or indirectly involves a flame in conduction, convection or radiant heat processes.

Devices employing conventional heat distribution processes have constantly been plagued by the problem of uneven heat distribution to the foodstuff often resulting in one section of the foodstuff being insufficiently or excessively heated or cooked and often leaving unsightly markings on the foodstuff.

SUMMARY OF THE INVENTION

The present invention is in a heating accessory suitable for use as a potato baker, bun warmer or the like wherein heat from a separate heat source is evenly distributed to prevent under- or overcooking and minimizing or eliminating unsightly burns or scar marks on the food.

The heating accessory comprises a first section and a cover or a second section; the first section having a top surface and depending walls which support the top surface. The top surface is formed with concentric rings of spaced openings; the outermost ring including apertures, and the inner ring including louvered vents. The louvered vents are disposed at an angle of between 10 and 35 degrees with respect to the horizontal top surface and, more particularly, at an angle of from 12 to 20 degrees and preferably at an angle of 15 degrees.

The top surface of the accessory is provided with a plurality of concentric centered raised rims. Each of the raised rims extends above the highest point of each of the louvered vents so that the foodstuff placed on the raised rim is properly balanced and elevated with respect to the openings in the louvered vents. Adjacent sets of parallel or concentric rims define a separate segment or annular ring. The outermost section, which is bounded at its outermost area by a peripheral rim, includes the apertures and louvered vents while the other inner segments include raised louvers.

Adjacent parallel or concentric rims serve as supports for a foodstuff such as a potato or bun which bridges the segments or annular rings defined by the respective rims. The rims are formed from a raised portion of the surface so that the underside of the top surface has air pockets directly beneath the rims.

The apertures and vents provide for a unique circulation pattern for the thermal air currents passing therethrough to uniformly and thoroughly bake the foodstuff. Thus, the radiant heat and the thermal or convection currents from the air heated by the flame rise vertically through the apertures whereas the heated air flowing through the louvered vents has a circular component imparted to its movement. As a result, the air streams interact and cause turbulence thereby assuring thorough and overall contact between the heated air and the foodstuff. Thus, the resulting air pattern heats or warms the foodstuff in an even manner. The foodstuff is supported by the raised rims above the top surface allowing the heated air to rise through the vents evenly exposing all sections of the food to the thermal currents. The cooking or heating of the foodstuff is not concentrated on the underside of the foodstuff which is heated by the surface. Further, the air pockets beneath the rims minimize the concentration of heat which would tend to burn or scar those areas of the foodstuff resting on the raised rims.

To further insure that the foodstuff is not scarred or burned a perforated platform may be placed on the top surface so that the platform underside is spaced above the louvered vents and the raised rims. The platform is positioned so that the outermost section of the top surface is not covered by the platform which now supports the potato or bun.

Various features of novelty which characterize the invention are pointed out with particularity in the claims annexed to anf forming a part of this specification. For a better understanding of the invention, its operating advantages and specific objects obtained by its use, reference should be had to the accompanying drawings and descriptive matter in which there is illustrated and described a preferred embodiment of the invention.

DESCRIPTION OF THE PREFERRED EMBODIMENT

Figure 1:
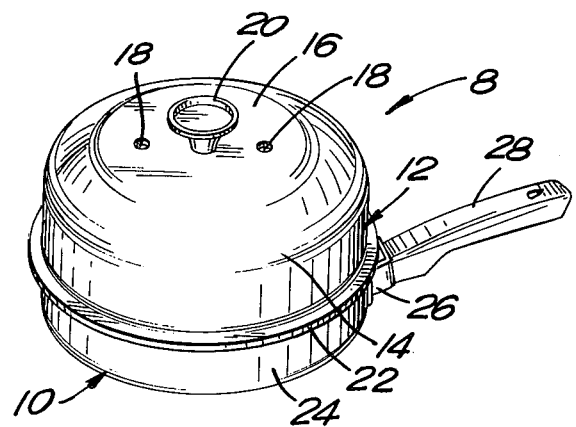
FIG. 1 is a perspective view of the heating accessory of the present invention.

Referring to the drawings, FIGS. 1 to 5, FIG. 1 shows a front elevational view of a heating accessory 8 having a first section 10 and a cover or second section 12. The cover or second section 12 is formed in a dome shape 14 having a flat surface 16 at the top thereof. The flat surface 16 has a plurality of holes 18 formed therein. A handle 20 extends from the flat surface 16. At the lower section, the cover 12 is fashioned with a declined outwardly extending lip 22. The first section 10 is formed with sidewalls or skirt 24 from which extends a bracket 26. A handle 28 engages and extends from bracket 26.

Figure 2:
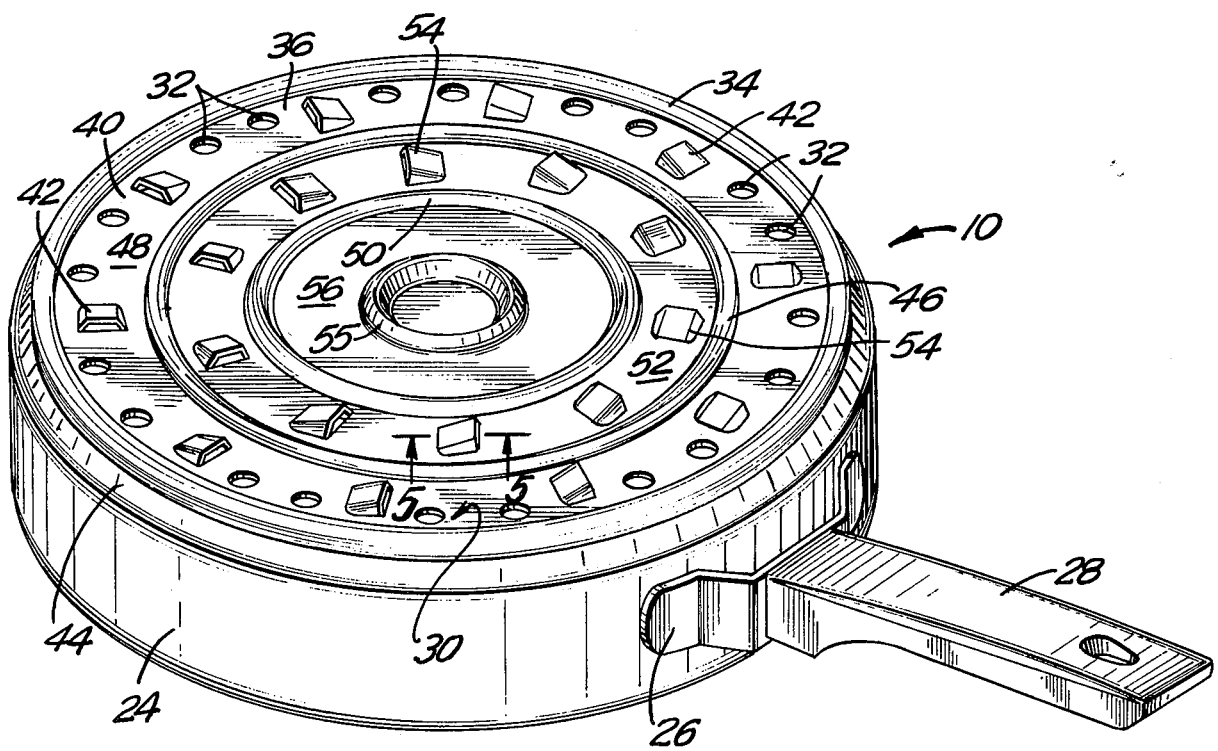
FIG. 2 is a perspective view of the first section of the invention.

Referring to FIG. 2, the first section 10 has a top surface 30 formed with a plurality of apertures 32 arranged adjacent a peripheral or circumferential rim 34. Preferrably, the apertures are grouped in pairs with an area 36 separating adjacent apertures within each group while adjacent groups are separated by a second area 40 wherein a raised louvered vent 42 is formed. The apertures 32 are approximately ¼ inch in diameter (6.35 mm). Top surface 30 is supported by the skirt 24 which is fashioned with a conical transition section 44 from which peripheral or circumferential rim 34 rises joining the surface 30 to the transition section. A second rim 46, concentric with and of small diameter than circumferential rim 34 is also formed on surface 30 so that rims 34 and 46, apertures 32 and vents 42 define a first annular ring or segment 48. A third rim 50, concentric with and of smaller diameter than circumferential rim 34 and second rim 46, form a second annular ring or segment 52 of surface 30. A second formation of individual louvered vents 54 is positioned within the second annular ring 52. A fourth concentric rim 55 may be formed in surface 30 to define a third annular ring 56 on surface 30.

Still referring to FIG. 2, it will be noted that the apertures are formed at an outermost section of the first annular ring or segment 48 and the first set of individual vents 42 are approximately positioned at the midpoint between rims 34 and 46. Likewise, the second set of vents 54 are centrally positioned on the second annular ring 52. Each of the vents 54 is radially aligned with the area 36 extending between adjacent apertures 32 within each group. Vents 42 are radially aligned with an area 48 extending between adjacent vents 54 in second annular ring 52. Thus it will be seen that individual sectors or wedges of top surface 30 are each provided with a vent, apertures or a combination of vent and apertures.

Figure 3:
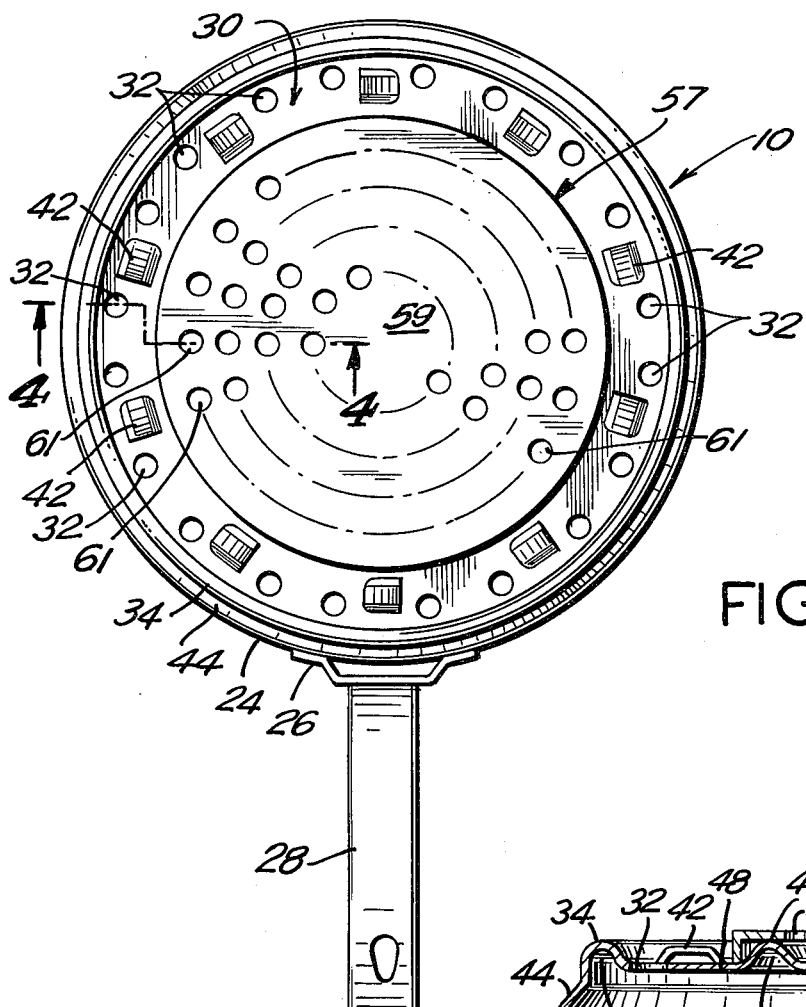
FIG. 3 is a plan view of an alternate embodiment of the invention.

FIG. 3 shows a plan view of the section 10 wherein a platform 57 is placed on an area of top surface 30. Platform 57 is formed with a surface 59 having apertures 61. Platform surface 59 provides an alternate support surface for the foodstuff if the heat source flame is too high or too hot so that the food won't burn or overcook on the rims 46 and 50.

Figure 4:
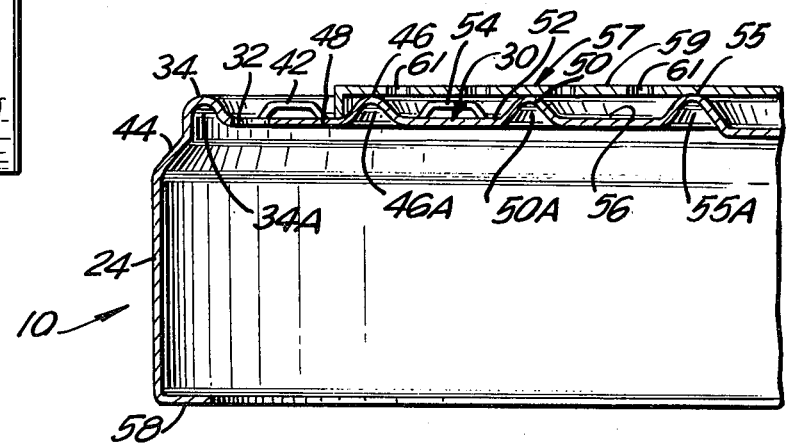
FIG. 4 is a sectional view taken along line 4—4 of FIG. 3.

Referring to FIG. 4 which is a sectional view along lines 4—4 of FIG. 3, rims 34, 46, 50 and 55 are formed as raised elements (rather than beads as used in the prior art) to forms pockets 34A, 46A, 50A and 55A respectively. As best seen in FIG. 4, each of the rims 34, 46, 50 and 55 extends above surface 30 and each of the vents 42 and 54. As best illustrated in FIG. 4, the skirt 24 has an inwardly extending lip 58. Lip 58 aids in support of section 10 on a stove burner or with respect to another heat source (not shown). It will also be noted that when the platform 57 is utilized, the supporting wall 59 is positioned so that it rests on surface 30 between the first formation of individual vents 42 and rim 46. Platform 57 is elevated above the louvers 54, and surface rims 46 and 50.

Figure 5:
FIG. 5 is a sectional view taken along line 5—5 of FIG. 2.

FIG. 5 shows a profile view of a vent 54 formed with a louvered section 60 resulting in an opening 62. The louvered section 60 is inclined with respect to surface 30 at an angle in the range of 10 to 35 degrees and more desirably at angles of 12 to 20 degrees, expecially 15 degrees. The width of the opening 62 is greater than the aperture dimension so that at least as much open area is associated with the vents of the outer segment as with the apertures of the outer segment.

In operation, the foodstuff is placed on the rims and the cover 12 is placed on the base section 10. The device is then placed over a flame on a stove top or the like. Hot air will rise vertically through the apertures 32. Thus, if only apertures were provided, as in prior art bakers, the rising air streams would strike the foodstuff in localized areas causing localized and uneven heating. However, in accordance with the present invention, the louvered vents will cause a circular component to be imparted to the velocity of the air stream. This circulating air will strike the air streams rising vertically through the apertures to cause turbulence within the dome-shaped cover 14. As a result, the heated air will be distributed throughout the baking area thereby ensuring the even and thorough baking of the foodstuff. The openings 18 in the cover provide a vent for the heated air in the baking area.

Since the foodstuff is supported by the rims, the heated surface 30, under normal circumstates, will not cause undue heating of the bottom surface of the foodstuff. Also, the raised rims will permit circulation of the heated air under the foodstuff to permit the even overall heating thereof.

However, in practice it has been found that if the operator sets the flame unduly high, hot spots occur and the bottom of the skin of the potato or other foodstuff may burn. Use of the platform 57 minimizes or eliminates this problem. By raising the foodstuff from the heated surface 30, the radient heat from the surface is minimized and conductive heat is significantly reduced. Since the platform does not extend over the apertures 32, the vertical air streams are not interfered with and the apertures or performations in the platform permit the free flow of air from the louvered vents with the resulting circulatory thermal currents.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

I claim:

1. A food heating device adapted for positioning over and surrounding a heat source, the device comprising a substantially planar surface supported by supporting walls, the surface having a plurality of peripherally disposed apertures to provide passages for vertically rising air streams, and a formation of circumferentially spaced louvered vents, the openings of each of said vents being disposed in a circular pattern to produce a circular flow of air from said vents for interacting with the vertically rising airstreams through said apertures.

2. The device of claim 1 wherein the surface is formed with at least one raised rim rising above the louvered vents.

3. The device of claim 1 wherein each of the at least one raised rims has an air pocket at the underside of the surface directly beneath the respective raised rim.

4. The device of claim 2 wherein the cover is formed with a declined extending lip for engagement with the transition section.

5. The device of claim 4 wherein the vents are louvered at approximately a 15 degree angle with respect to the surface.

6. The device of claim 1 wherein the vents are louvered with respect to the surface at an angle between 10 and 35 degrees.

7. The device of claim 1 wherein the vents are louvered with respect to the top surface at an angle of between 12 and 20 degrees.

8. The device of claim 1 wherein a transition section extends from the supporting wall to the surface, and a cover section having apertures therein is adapted for fitting engagement with the transition section to enclose the surface.

9. The device of claim 1 wherein an inwardly directed lip extends from the supporting walls at a lower section thereof.

10. The device of claim 1 wherein the supporting walls have a bracket and extending handle connected thereto.

11. The device of claim 1, further comprising an apertured platform having support legs resting on the surface inward of the outmost formation of vents.

12. The device of claim 11 wherein the platform is elevated above the surface above the formation of vents.

13. A food heating device adapted for positioning over and surrounding a heat source, the device comprising a surface supported by supporting walls, the surface having a plurality of peripherally disposed apertures and a formation of louvered vents, said surface being formed with at least one raised rim rising above the louvered vents, one of the at least one raised rims forming a circumferential boundary, the apertures being proximate the boundary and wherein the louvered vents are distributed in at least two sets, each set being concentric with the circumferential boundary.

14. The device of claim 13 wherein the surface has at least one other raised rim concentric to the circumferential boundary.

15. The device of claim 13 wherein the apertures alternate with a first set of the vents in a circumferential pattern on the surface to form a first segment which is concentric with and surrounds a second segment having a second set of vents circularly disposed therein, the apertures being grouped in sets, of two with a space between each aperture of each group, and respective vents of the second set being generally radially aligned with the respective spacing of each group of apertures.

16. The device of claim 15 wherein the vents of the first set are radially aligned with the spacing between adjacent vents in the second set.

17. A device for baking foodstuffs comprising a bottom portion and a cover therefor, whereby a baking area is defined between said bottom portion and the walls of said cover; said bottom portion comprising a baking surface having support means for supporting said surface over and in spaced relationship to a source of heat; said baking surface having a plurality of groups of concentrically located openings; each opening in a group being circumferentially spaced from the adjacent opening in said group; the outermost group of openings comprising apertures to permit the vertical rise of heated air therethrough; the other of said plurality of groups of openings comprising louvered vents the openings of which are disposed in a circular pattern and each having an outlet at an angle to said surface so that heated air flowing through said vent outlet enters said baking area with a circular component of velocity, whereby the air streams entering the baking area through said apertures and vents intermix to cause turbulence.

18. A device as in claim 17, wherein the cover includes vent holes therein.

19. A device as in claim 17, and raised rims between each of said groups of openings.

20. A device as in claim 17, further comprising a perforated platform on said surface, said platform having a depending wall to raise said platform above said surface, said platform being sized to be located inboard of said outermost group of apertures when centrally located on surface.

* * * * *